United States Patent Office 3,456,615
Patented July 22, 1969

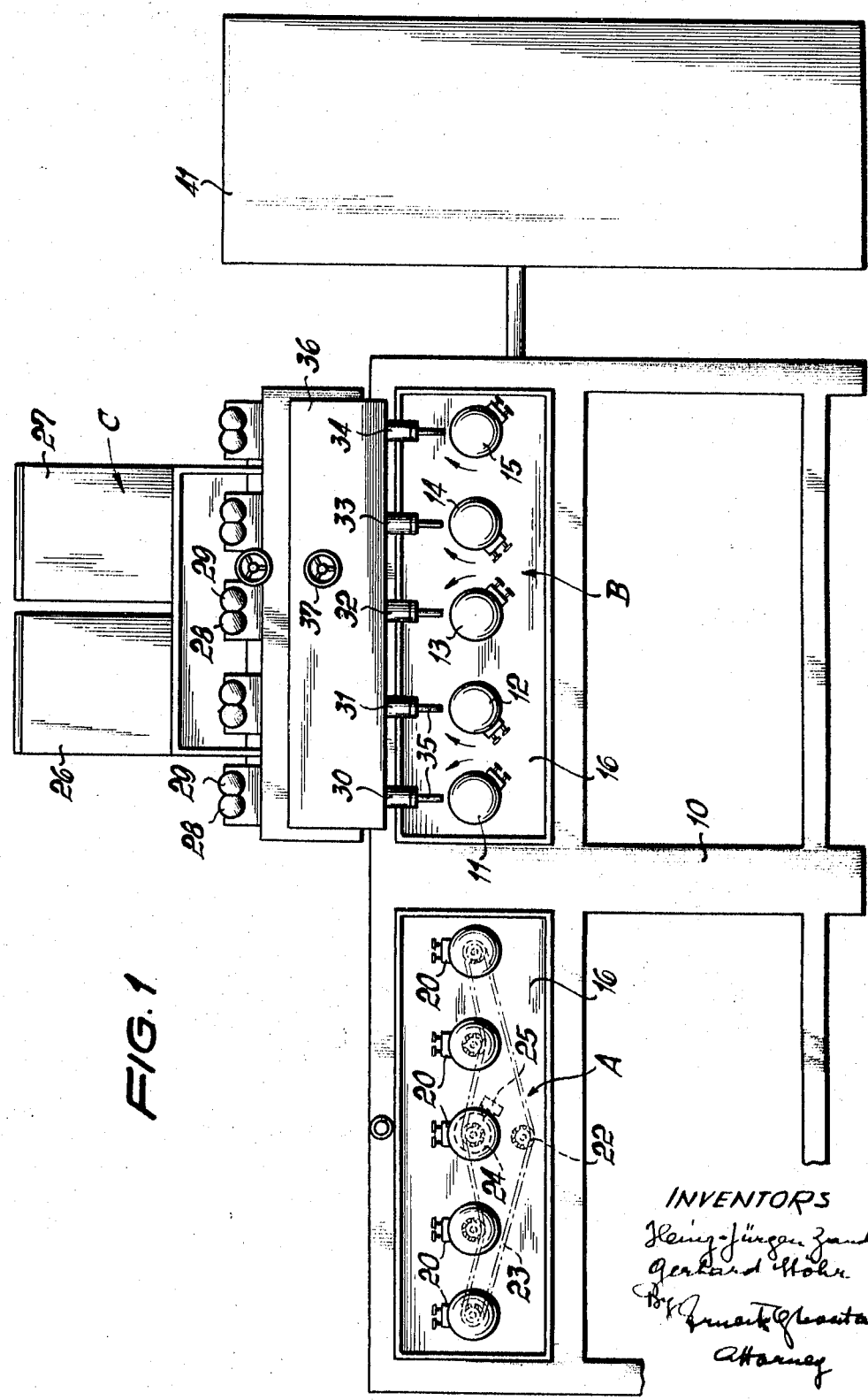

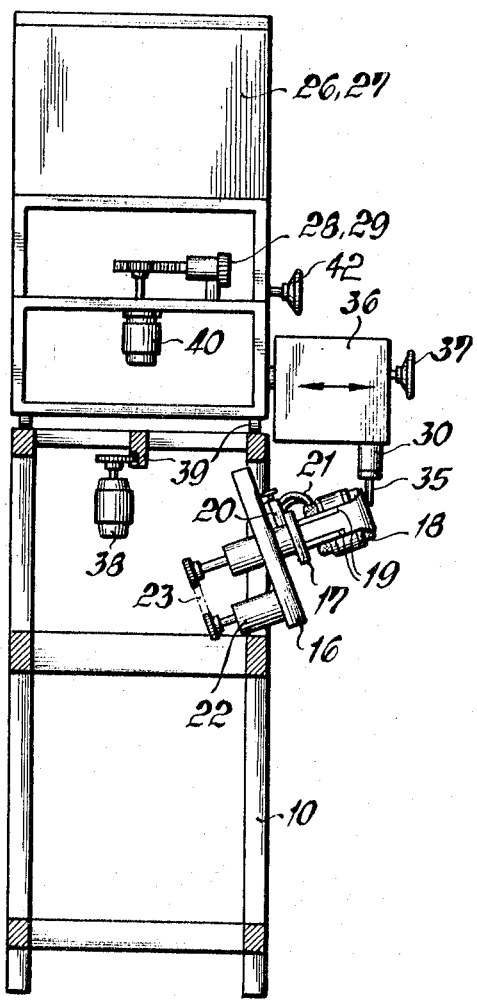

3,456,615
APPARATUS FOR IMPREGNATING OF ONE- AND MULTI-PHASE STATOR WINDINGS
Heinz-Jurgen Zander, Viersen, and Gerhard Stohr, Suchtein, Germany, assignors to Gesellschaft fur Elektrotechnik m.b.H., Viersen, Germany, a corporation of Germany
Filed Aug. 20, 1965, Ser. No. 481,219
Claims priority, application Germany, Aug. 21, 1964, G 41,367
Int. Cl. B05c 11/14
U.S. Cl. 118—5                          9 Claims

ABSTRACT OF THE DISCLOSURE

An apparatus for impregnating of one- and multi-phase windings with a resin-hardener mixture, which comprises a frame, at least two working stations disposed adjacent each other and supported by the frame. Each of the working stations forms an independent structural unit. Means are provided for rendering operative alternately the working stations independently from each other. A common dripping device is rollable from one of the working stations to the other of the working stations and is coordinated to the latter. Each of the working stations includes a plurality of working positions. Each of the working stations includes a bearing plate swingably mounted at the front of the frame. A plurality of stator holders project from one side of the bearing plate at the same level and substantially equally spaced apart from each other. An electro clamping box is provided for each of said stator holders and for connecting the stator winding wires. Means are arranged for rotating the holders jointly with clamping boxes, and means are also arranged for controlling the rotary movement of the holders, such, that upon termination of the rotary movement of the holders at the end of the entire process, each of the clamping boxes is put into an upsided ready position.

---

The present invention relates to an apparatus for impregnating of one- and multi-phase stator windings in general, and to such impregnation with a multi-component resin in particular, whereby the stator is received by a rotating holder, preheated to a pre-selectable temperature, dripped with resin and, thereafter, thermally hardened.

It is known that the stator winding, which is labile-soft by nature, must be secured, which is brought about in the practice by impregnation with an insulating varnish. This securing of the stator winding takes place generally such, that the stators are preheated within a particular heating oven, then impregnated by dipping into a varnish bath and then again hardened in a drying oven. This working process is not economical, since it extends over several hours.

It has been proposed already, therefore, to use a rapidly hardening resin, instead of the slowly drying varnish, and to perform the impregnation process at least partly mechanically, whereby the preheating temperature of the stator is obtained by electrical heating of the stator winding itself. Here, already the hardening performed after the dripping process is performed by electrical heating. This manual method has the drawback that the instantaneous temperatures deviate strongly during the dripping, as well as during the hardening from the index value.

The method of the present invention is distinguished in an advantageous manner over the previously known impregnation processes such, that the preheating as well as the hardening heating of the resin dripped stator winding controls itself electrically by self-observation. This is brought about such, that a periodic time switch for the control of the heating current for the stator winding is operated by electric switching impulses in continuous alternating succession with a measuring process by means of a resistance bridge for observation of the winding resistance of the stator winding. Upon reaching the resistance value required for the preheating temperature of the winding, the heating current switches off and it switches on again only, when the measuring instrument shows a lower value. This process is controlled by a light gate, so that the temperature can be maintained quite constant.

With the start of the preheating operation, a switching member which is responsive to the heating current operates the dosing pump for the resin and the hardener. The materials are fed to the mixing container or chamber and are there admixed. Upon reaching the instantaneous temperature, the dripping process is started by a magnetically controlled outlet valve. When the resin hardener mixture is required by the winding, an automatic switching over takes place to a second resistance bridge, which is set for the predetermined higher hardening temperature. Here again, current is fed by electric impulse heating as long until the resistance value of the winding coordinated to the hardening temperature is reached. The temperature is maintained constant up to the termination of the hardening process.

By the practical realization of the working process according to the present invention, it has been brought about for the first time to perform the individual working steps for the impregnation of the stator winding in an uninterrupted working procedure fully automatically. In particular, this is achieved substantially by the self-observation of each individual working step combined with the dependency control for the release and start, respectively, of the next following working step. The only manual labor, which still has to be performed, is the mounting of the stators to be treated on the holders and their removal after the hardening process.

In the method of the present invention, the fact is of importance, that the heating of the stator for achieving the required preheating temperature, on the one hand, and the heating for the hardening process of the already dripped stator, on the other hand, is performed by means of a periodic time switch in connection with an electric bridge, so that alternately heating is performed and the instantaneous temperature obtained from time to time is measured. Thus, an appreciably reliable and safe observation of the temperature is assured.

Also in the method of the present invention, the control of the feeding pumps in dependency upon the heating current flow is of decisive importance, because a feeding of the resin and of the hardener, which are fed independently from each other, sets in only then, when the stator is ready therefor. That means for the practice that, upon lack of heating current, caused by a faulty connection of the winding connecting wires or due to lack of feeding of the stator, no resin and no hardener are fed and admixed. A faulty impregnation and unnecessary consumption of resin, respectively, are thereby avoided. The control of the heating current can be performed for example by means of current transformers in the connecting conduits of each electric clamping box or with a magnet switch which is placed in the stator bore and is operated by its magnetic field.

Likewise in this connection, the self-observing heating-temperature depending control of the outlet valve of the mixing chamber is of importance, because the outlet opening of the mixing chamber is rendered free thereby only then, when the stator winding is brought to the index temperature. Also, the then following gelating and hardening process, the start of which, in turn, is controlled in dependency upon the emptying of the mixing chamber, follows thus in automatic succession the prior working steps.

By the electrical self-observation of the individual working steps and by the dependent start of the always following working step, not only a fully automatic working program of the individual working steps is brought about, but in addition the actual working time is appreciably shortened, and the economy of the impregnation is also decisively improved.

It is also an object of the present invention to provide an apparatus for performing the method, as set forth above.

It is still another object of the present invention to provide an apparatus for impregnating of one- and multiphase stator windings, wherein the apparatus comprises at least two working stations disposed in series arrangement next to each other and each forming a unitary structural unit, which working stations are switchable, independently from each other, alternately to working readiness. Furthermore, a joint dripping device rollable from station to station is coordinated to both working stations and thereby each working station is formed as a multiple working position. This is made possible by providing on a bearing plate for each working station swingably mounted at the front of the machine frame a plurality of holders serving the purpose of receiving the stators, disposed at the same level and at the same distance from each other, as well as projecting to one and the same side relative to the bearing plate. Each of the holders is equipped with its own electric clamping box serving the connection of the stator winding wires, which holders are either self-driven or participate on a joint drive, as well as are controlled such, that upon termination of the rotary movement of the holders at the end of the total working process, each clamping box is rendered into an upside readiness position.

This apparatus is particularly advantageous and purposeful for the reason, that it operates alternately as a twin apparatus. It is namely possible, if one working station is in its operative state, to prepare the resting, thus inoperative, second working station again already for the new working process, that means, the finished stators can be removed from the holders and the stators still to be treated can be now mounted and clamped on. Furthermore, it is thereby of advantage that the apparatus is realized in a series arrangement, because in such arrangement both working stations cannot only be served from the same side, but can also be observed from the same side.

With these and other objects in view which will become apparent in the following detailed description, the present invention will be clearly understood in connection with the accompanying drawing, in which:

FIGURE 1 is a front elevation of the apparatus, designed in accordance with the present invention, seen from the service side thereof; and FIG. 2 is an end view thereof, partly in section.

Referring now to the drawing, the apparatus permitting the performance in accordance with the method of the present invention comprises a machine frame 10, in which the two working stations A and B are provided, which form structure units which are self-dependent and independent from each other. A mixing and dosing device C is rollable in this machine frame 10 in a plane above the individual working positions 11, 12, 13, 14 and 15 in longitudinal direction of the working stations A and B.

A plurality of individual working positions 11, 12, 13, 14 and 15 are provided in each working station A and B on a bearing plate 16 swingably mounted at the front of the station. Each working position 11, 12, 13, 14 and 15 constitutes a holder 17 for the reception of a stator 18, which is retained on a kind of clamping fork 19. Each holder 17 is equipped with its own electrical clamping box 20 for securing the connecting wires 21 of the stator winding. All stator holders 17, 19 and 20 point to the same side, namely to the service side of the apparatus. On the back side of the swinging plate 16 is disposed a joint driving motor 22 in the shown embodiment for the drive of the stator holders 17, 19 and which motor 22 drives by means of a drive chain 23 connecting all the holders centrally and jointly. At least one of these holders has a control cam 24, which cooperates with an end switch 25, so that upon stopping the rotary movement of the holders, the latter remain in the position as shown in the working station A, and thus assume a readiness position for the simplification of the connection and disconnection, respectively, of the connecting wires 21.

The mixing and dosing device C comprises substantially two storage containers 26 and 27, a pair of feeding pumps 28 and 29 for the separate feeding of resin and hardener, as well as mixing chambers 30, 31, 32, 33 and 34, and the outlet valves 35. The dripping device C has a plurality of individual dripping positions 30, 31, 32, 33 and 34, corresponding with the number of the individual working positions 11, 12, 13, 14 and 15. The member 36, which carries the mixing chambers 30, 31, 32, 33 and 34, can be adjusted by means of a setting wheel 37 in the shown direction of the arrows in FIG. 2 along the longitudinal axis of the stator holders 17, 19 and 20, in order to adjust always the exact position between the outlet valve and the stator winding. The running gear 39 of the dripping device C is driven by means of a special driving motor 38. The pumps 28 and 29 have, likewise, their own driving motor 40. Finally, an electric switching box 41 is arranged for receiving all electrical switching members, which is disposed adjacent the apparatus.

The individual working steps run as follows fully automatically one after another: If it is assumed, for instance, that the working station B is in its operative state, then the individual working positions 11, 12, 13, 14 and 15 of the working station A can be brought into readiness by mounting of stators to be treated. If this is done, by operation of a switching knob 42 upon termination of the working process at the working station B, the dripping device C can be moved to the working station A. As the next working step then the preheating of the stators to the required preheating temperature of about 80° C. takes place. During this preheating, resin and hardener are separately fed to the dosing chambers 30, 31, 32, 33 and 34 and here admixed by means of the control of the feeding pumps 28 and 29, which control is dependent upon the heating current flow. The working positions 11, 12, 13, 14 and 15 swing during this time period into an inclined position shown in FIG. 2. If the required preheating temperature is obtained, the outlet valve 35 of each mixing chamber is switched to dispensing by the mixing chambers 30, 31, 32, 33 and 34. The dripping resin runs now to the stator windings.

Upon termination of the dripping operation, the bearing plate 16 swings back to its original position, so that the stators 18 assume an exactly horizontal position. With the termination of the dripping operation, the start of the hardening process is released by means of a switch impulse. The hardening, which is performed at a temperature of about 120° C., is likewise automatically observed and puts to a stop at the end of the hardening period the rotation of the stator holders 17, 19 and 20 which were subjected to rotation during the entire working period, whereby the impregnation process is completed.

It is understood that the apparatus for performing the method of the present invention can deviate also from the shown apparatus, the alternating operation of the individual working stations A and B, independently from each other, as well as the formation of each working station as multiple working position with all stator holders disposed in the same direction and to the same side are decisive, however. Finally, also the technical means for performing an automatic observation of the individual working steps can deviate from those disclosed.

We claim:
1. An apparatus for impregnating of one- and multiphase stator windings with a resin-hardener mixture, wherein a stator is received by a rotating holder, comprising means for
preheating stator windings,
applying a mixture of resin and a hardener to said stator windings,
thermally heating thereafter said stator windings in order to harden said applied mixture,
observing the prevailing instantaneous temperature of said stator windings by means of a resistance bridge for switching on and off, respectively, by electric impulses a periodic time switch for the control of the heating current for the stator in continuously alternating succession, whereby the preheating and the hardening being self-observingly electrically controlled,
self-controlling the feeding of said resin and of said hardener to said stator windings in dependency upon the flow of heating current for said preheating of said stator windings,
electrically controlling the release of said mixture in dependency from the index value of the temperature of said stator windings at the zero position of said resistance bridge, and
initiating the start of said hardening by an electric impulse by swinging a stator holder into horizontal position in dependency upon the ceasing of the flow of said mixture.

2. An apparatus for impregnating of one- and multiphase windings with a resin-hardener mixture, comprising
a frame,
at least two working stations disposed adjacent each other and supported by said frame,
each of said working stations forming an independent structural unit,
means for rendering operative alternately said working stations independently from each other,
a common dripping device rollable from one of said working stations to the other of said working stations and coordinated to the latter,
each of said working stations including a plurality of working positions,
each of said working stations including a bearing plate swingably mounted at the front of said frame,
a plurality of stator holders projecting from one side of said bearing plate at the same level and substantially equally spaced apart from each other,
an electro clamping box provided for each of said stator holders and for connecting the stator winding wires,
means for rotating said holders jointly with clamping boxes, and
means for controlling the rotary movement of said holders such that upon termination of the rotary movement of said holders at the end of the entire process, each of said clamping boxes is put into an upsided ready position.

3. The apparatus, as set forth in claim 2, wherein said means for controlling the rotary movement of said holders comprises a control cam and at least one switch operatively connected with said control cam, and
said control cam is disposed at the driven end of at least one of said stator holders.

4. The apparatus, as set forth in claim 2, wherein said stator holders are formed with at least two arms.

5. The apparatus, as set forth in claim 2, wherein said stator holders are formed as a three-pin fork.

6. The apparatus, as set forth in claim 2, which includes
a dripping device having a running gear and a plurality of working positions equal in number with that of said stator holders,
each of said working positions including a feeding pump and a mixing chamber, and
means for adjusting said mixing chamber in the direction of the longitudinal axis of said stator holders.

7. The apparatus, as set forth in claim 6, which includes a magnetically operated switch for controlling said feeding pumps in dependency upon the heating current for the stators.

8. The apparatus, as set forth in claim 6, which includes a current transformer for controlling said feeding pumps in dependency upon the heating current for the stators.

9. The apparatus, as set forth in claim 2, which includes electrical control means comprising a periodic time switch for the control of the heating current for the stator winding, and
a control box disposed adjacent said frame and receiving said electrical control means.

References Cited

UNITED STATES PATENTS

| 1,675,419 | 7/1928 | Myers | 117—93 X |
| 2,417,538 | 3/1947 | Alexander | 117—119.6 X |
| 2,442,183 | 5/1948 | Stearns | 118—620 X |
| 2,561,982 | 7/1951 | Hanna et al. | 117—49 X |
| 2,574,686 | 11/1951 | Brown | 117—105.4 X |
| 2,784,288 | 3/1957 | Moran et al. | 219—492 |
| 3,025,706 | 3/1962 | Oppenheim. | |
| 3,102,183 | 8/1963 | Harrison | 219—499 X |
| 3,195,044 | 7/1965 | Flanagan | 219—499 X |
| 3,215,818 | 11/1965 | Deaton | 219—499 |
| 3,283,742 | 11/1966 | Fuchs et al. | 117—105.5 X |

FOREIGN PATENTS 681,860  10/1952  Great Britain.

ALFRED L. LEAVITT, Primary Examiner

J. H. NEWSOME, Assistant Examiner

U.S. Cl. X.R.

73—362; 117—49, 93, 105.4, 105.5, 128.4, 232; 118—8, 53, 56, 313, 321, 620; 219—492, 499

UNITED STATES PATENT OFFICE
CERTIFICATE OF CORRECTION

Patent No. 3,456,615                             July 22, 1969

Heinz-Jurgen Zander et al.

It is certified that error appears in the above identified patent and that said Letters Patent are hereby corrected as shown below:

In the heading to the printed specification, line 5, "Suchtein" should read -- Suchteln --.

Signed and sealed this 5th day of May 1970.

(SEAL)

Attest:

Edward M. Fletcher, Jr.                  WILLIAM E. SCHUYLER, JR.

Attesting Officer                            Commissioner of Patents